3,135,713
PROCESS FOR THE PRODUCTION OF ORGANO-
POLYSILOXANE RESINS USING CERTAIN AM-
MONIUM COMPOUNDS
Stuart D. Brewer, Burnt Hills, and Robert P. De Sieno,
Netherlands Village, Schenectady, N.Y., assignors to
General Electric Company, a corporation of New York
No Drawing. Filed Feb. 26, 1960, Ser. No. 11,157
7 Claims. (Cl. 260—46.5)

The present invention relates to the production of improved organopolysiloxane resins having superior insulating properties. More particularly, the present invention relates to the use of certain ammonium compounds in the manufacture of curable organopolysiloxane resins which have improved stability during storage, and which are useful for the production of insulating materials that have superior weight loss resistance at elevated temperatures.

Although organopolysiloxane resin coatings have long been recognized as outstanding insulating materials because they are heat resistant over extended temperature ranges, problems have arisen under actual operating conditions due to either inadequate or improper initial cure of the resin, or to premature breakdown of the cured resin coating. For example, when an organopolysiloxane resin is applied to a surface that is subjected to high temperature extremes, such as in the transformer industry, a softening or peeling of the resin can occur which can result in alteration of the desirable insulating qualities of the resinous coating. One explanation for this breakdown in performance can be ascribed in part to an inadequate degree of silanol dehydration at the cure time which is usually sometime after the resin is applied to the desired substrate. The amount of available silanol in the resin at the time of cure, that is, the number of its free silicon-bonded hydroxyl groups which are available for intercondensation, would depend on both the initial silanol content of the resin at the time of its manufacture, and the "silanol stability" of the resin, that is, the ability of the resin to maintain its initial level of silanol over extended "shelf periods" before being used.

It has long been suspected that silanol dehydration, which is the generally recognized method by which organopolysiloxane resins achieve proper cure, is prematurely catalyzed during the "shelf period" by contaminating metal ions which can be introduced into the resin during the manufacturing stages. Contaminating ions are also thought to be the principal reason why organopolysiloxane resins can exhibit poor heat life stability while in the form of a properly applied cured resin coating. Excessive resin weight loss results from resin decomposition that is catalyzed by contaminating metal ions at elevated temperatures.

Prior to the present invention it had been customary to employ sodium bicarbonate as a neutralizing agent in the form of an aqueous slurry to remove quickly the hydrolysis acid formed in the manufacture of organopolysiloxane resins. Standard procedures of recovery and purification of the resinous reaction product were not found to be sufficiently reliable to offset the undesirable after effects that were believed to be caused by some form of metal ion contamination. It was not unusual therefore to observe that after only a few days on the shelf or in storage, a crystal clear organopolysiloxane resin that was manufactured by the sodium bicarbonate process would acquire a hazy appearance, or even gel, due to premature silanol condensation.

It has now been discovered that organopolysiloxane resins having markedly increased silanol content and stability, and cured organopolysiloxane resin coatings having superior heat life stability are produced by the use of ammonium compounds such as ammonia, and ammonium salts of carboxylic acids as neutralizing agents for the excess by-product acid produced during the hydrolysis of the halosilanes in the manufacture of the resin.

In accordance with the present invention there is provided a process for the production of organopolysiloxane resin having the formula:

(1) 
$$(R)_a SiO_{\left(\frac{4-a}{2}\right)}$$

where $a$ is equal to 1.0 to 1.8, inclusive, and R is a member selected from the class of monovalent hydrocarbon radicals, halogenated monovalent hydrocarbon radicals, and cyanoalkyl radicals, comprising the steps of (1) agitating a reaction mixture comprising halosilanes, water, and an ammonium compound selected from the class of ammonia, ammonium salts of carbonic acid and ammonium salts of carboxylic acids while maintaining the said reaction mixture at a pH in the range of about 5 to about 8.5 and (2) recovering the organopolysiloxane reaction product as a separate phase from the resulting reaction mixture, said halosilanes of (1) being members selected from the class of organotrihalosilanes, and mixtures of halosilanes containing an average ratio of from 1 to 1.8 inclusive, carbon-silicon bonded organo radicals per silicon atom.

The ammonium compounds that are within the scope of the present invention include ammonia, ammonium salts of carbonic acid and all ammonium salts of carboxylic acids of low or moderate acid strength. The preferred ammonium compounds are ammonia, ammonium salts of carbonic acid and ammonium salts derived from carboxylic acid that can be volatilized or sublimed below 20° C. Ammonium carbonate is particularly preferred. In addition to ammonium carbonate, specific examples of other ammonium salts that are operable are ammonium bicarbonate, and ammonium salts of such weak acids as formic, acetic, oxalic, malonic, lactic, pyruvic, ascorbic, and other acids of low or moderate strength.

Halosilanes that are included within the scope of the present invention to produce the organopolysiloxane compositions of Formula 1 are represented by the formula:

(2) 
$$(R)_{4-b}Si(X)_b$$

where $b$ is an integer equal to from 1 to 4 inclusive, R is as defined in Formula 1, and X is a halide radical such as for example, chloro or bromo. R is more particularly illustrated by alkyl and chloroalkyl radicals, including methyl, ethyl, chloroethyl, propyl, octyl, etc. radicals; aryl and chloroaryl radicals, including phenyl, chlorophenyl, diphenyl, naphthyl, tolyl, xylyl, etc. radicals; aralkyl radicals including benzyl, phenethyl, etc. radicals; and cyanoethyl, cyanopropyl, etc. radicals. Specific examples of the above organohalosilanes of Formula 2 include for example, tetrachlorosilane, methyltrichlorosilane, dimethyldichlorosilane, methylphenyldichlorosilane, cyanoethyltrichlorosilane, phenylethyldichlorosilane, diphenyldichlorosilane, etc.

Mixtures of the above silanes are usually employed in the practice of the present invention to produce the desired organopolysiloxane resins. In particular instances organotrihalosilanes can be employed alone for satisfactory results. The preferred blend is a mixture of organotrihalosilane and organodihalosilane, where there can be up to 4 moles of organodihalosilane per mole of organotrihalosilane. Other operable mixtures can include various blends of tetrahalosilanes, with organomonohalosilanes, organodihalosilane and organotrihalosilane, or various combinations thereof, providing the mixtures that are hydrolyzed have an average ratio of 1 to 1.8 carbon-silicon bonded organo radicals per silicon atom.

In the practice of the invention, an organopolysiloxane resin is produced by the hydrolysis of a mixture of halosilanes while the resulting acid by-product is neutralized with a suitable ammonium compound.

In order to insure a high degree of silanol in the final organopolysiloxane reaction product, it has been found expedient to avoid unduly exposing the halosilane hydrolysis reaction product to detrimental amounts of the by-product acid so as to reduce premature condensation. It is preferred therefore to conduct the hydrolysis of the organohalosilanes in the presence of an effective amount of the ammonium compound to maintain the required range of pH. In addition, it is desirable to introduce the halosilanes in the reaction mixture in the form of a hydrocarbon solvent solution which minimizes undesirable side reactions and facilitates recovery of the organopolysiloxane reaction product. Suitable hydrocarbon solvents that can be employed for example, are toluene, benzene, xylene, etc. During the hydrolysis and neutralization stages, it is also desirable to promote silanol formation which can be accomplished by a high degree of agitation such as by rapid stirring with rotary blades and the like, or other means generally known to those skilled in the art.

Although at least a sufficient amount of ammonium compound should be employed in the reaction mixture to neutralize any detrimental amounts of hydrolysis acid, experience has demonstrated that satisfactory curable organopolysiloxane resins have been produced from reactions which have been conducted in pH ranges as low as about 5 and as high as about 8.5, depending on the temperature at which the reaction was conducted and the rate at which the final product was recovered from the reaction mixture. A preferred range of pH is between about 5.5 to about 7.5.

In order to insure the removal of all the hydrolysis by-product acid produced during the reaction mixture, it is necessary to add at least a stoichiometric amount of the ammonium compound, that is an amount equivalent to the total hydrolyzable halide content of the initial starting silane reactants. Excess amounts of ammonium compound therefore, can be added, but it is not expedient to exceed the solubility point of the compound in the reaction mixture so as to avoid the formation of slurries which can interfere in the separation of the final reaction product.

The temperature at which the hydrolysis and neutralization step is conducted is not critical. Temperatures in the range of about 0° C. to about 60° C. are preferred, but the operable ranges at which the reaction can be conducted is influenced to some extent by the physical properties of the reactants, solvents, etc. such as boiling and freezing points, etc. It should be appreciated, however, that temperatures above about 60° C., particularly in low pH ranges can adversely affect the silanol content of the organopolysiloxane reaction product.

After the hydrolysis of the halosilanes and the neutralization of the acid by-product are completed, the reaction mixture is allowed to separate. The neutralization and hydrolysis reaction can be accomplished in a few minutes or can last many hours, such as ten or more, depending on the degree of agitation, rate of addition, temperature control desired, etc. If hydrocarbon solvent is employed in conjunction with the halosilanes, there will be an upper organic layer containing the organopolysiloxane reaction product and a lower aqueous layer. The organic layer can be recovered by known means such as for example, gravity separation, etc. and if desired it can be washed with water and the like, to minimize the contamination of the final reaction product. The organopolysiloxane can then be recovered by stripping off the excess organic solvent.

A number of organopolysiloxane resins were made having R to Si ratios over a range of 1 to 1.7, i.e. having an average of 1 to 1.7 carbon-silicon bonded organo groups per silicon atom, according to the practice of the present invention and the prior art method. The process of the present invention described later in the examples, will be hereinafter referred to sometimes as "the ammonium carbonate process." The prior art method, or "sodium bicarbonate process" is illustrated as follows:

In a reaction vessel equipped with a stirrer, thermometer, condenser and silane addition tube, there were charged 400 parts of water, and 143 parts of sodium bicarbonate. To the resulting sodium bicarbonate slurry, there was added slowly with stirring, 190 parts of a 53% solution of phenyltrichlorosilane in toluene. The addition of the silane solution was conducted over a period of 25 minutes, during which time the temperature which was initially 25° C., rose to about 40° C. After the addition was completed, the mixture was stirred rapidly for an additional 15 minutes.

An emulsion layer which had formed at the interface was drawn off, and the upper organic layer was pressure filtered at 20 p.s.i. The filtrate was then vacuum stripped to 65% solids. The product had an R to Si ratio of 1.

Two additional resins were prepared according to the "sodium bicarbonate process" shown above, having R to Si ratios of 1.5 and 1.7 respectively. In preparing the 1.5 resin, there was employed 135 parts of sodium bicarbonate and 190 parts of a 53% toluene solution of an equal molar blend of phenyltrichlorosilane and dimethyldichlorosilane. The 1.7 resin required 139 parts of sodium bicarbonate and 190 parts of a 53% solution in toluene of a silane blend containing phenyltrichlorosilane and dimethyldichlorosilane in a 3 to 7 mole ratio of the phenylsilane to the dimethylsilane.

In order that those skilled in the art can better practice the present invention, the following examples are given by way of illustration and not by way of limitation. All parts are by weight.

EXAMPLE 1

There was charged to a flask equipped with a stirrer, thermometer, condenser and silane addition tube, 400 parts of water and 91 parts of ammonium carbonate. To the resulting solution, 190 parts of a 53% solution of an equal molar blend of phenyldichlorosilane and dimethyldichlorosilane in toluene was slowly added over a period of about 30 minutes while maintaining the temperature in the range of 25° to 40° C. during the addition. The mixture at a pH of about 6.3 was then stirred for 15 minutes. The mixture was allowed to separate and the organic layer was recovered and pressure filtered at about 20 p.s.i. and stripped to 65% solids. The R to Si ratio of the resin was 1.5.

EXAMPLE 2

A solution of 130 parts of ammonium carbonate and 400 parts of water was prepared in accordance with Example 1. One hundred and ninety parts of a 53% solution of phenyltrichlorosilane in toluene was added slowly to the ammonium carbonate solution with stirring. The addition lasted 35 minutes over a range of temperature of 12° C. to about 35° C. The mixture at a pH of about 6.5 was stirred for an additional 10 minutes and allowed to separate into two layers. The organic layer was recovered and washed.

The organic layer was pressure filtered and reduced to 55% solids content. The resin sample had an R to Si ratio of 1.

EXAMPLE 3

The procedure of Example 1 was repeated, except an ammonium carbonate solution of 130 parts of ammonium carbonate and 400 parts of water was reacted with 190 parts of a 53% solution of a silane blend in toluene of phenyltrichlorosilane and dimethyldichlorosilane. A molar ratio of 7 moles of dimethyldichlorosilane to 3 moles phenyltrichlorosilane was employed in the blend. The mixture at a pH of about 6.5 was allowed to separate, and the final product had an R to Si ratio of 1.7 upon recovery.

EXAMPLE 4

In a flask equipped as in Example 1, there was charged 400 parts of water and 115 parts of ammonium acetate. To the resulting solution there was slowly added over a 30 minute period, 190 parts of a 53% solution in toluene of an equal molar blend of phenyltrichlorosilane and dimethyldichlorosilane while the temperature was maintained at 12 to 15° C. After stirring the mixture was allowed to separate, and the pH of the aqueous layer was 5.5. The product was recovered by gravity separation and stripping. The final product had an R to Si ratio of 1.5 and a 4.5% silanol content based on the Zerewitinoff method.

EXAMPLE 5

To a flask equipped as in Example 4, containing 200 parts of a 26% solution of ammonium hydroxide, there was added with stirring, 190 parts of a 53% solution in toluene of an equal molar blend of phenyltrichlorosilane and dimethylchlorosilane over a thirty minute period. The temperature was maintained by external cooling over a range of 20° to 30° C. during the addition. The mixture was then allowed to separate and the product was recovered by stripping the organic layer. The final product had an R to Si ratio of 1.5 and a silanol content of 5%.

The following tables demonstrate the marked advantages of the ammonium carbonate process of the present invention over that of the prior art sodium bicarbonate process, in the production of organopolysiloxane resins having improved shelf life and heat life stability. In addition, the resins produced in accordance with the present invention can be employed in the production of coating materials having improved dielectric strength.

Table I illustrates the superior shelf life stability of the organopolysiloxane resins made according to the ammonium carbonate process as illustrated by Examples 1, 2 and 3, compared to the resin samples made by the prior art sodium bicarbonate process, where the resins evaluated had an average R to Si ratio over a range of 1 to 1.7. Measurements were made with the aid of a Nepholometer, by measuring haze values in terms of parts per million (p.p.m.) of water through standard size transparent capped containers that were filled with the various resin solutions adjusted to a 60% solids content. The bottles were allowed to stand undisturbed on a shelf throughout the test period at room temperatures. An increase in haze would be directly proportional to the degree of water formed by premature silanol condensation that were believed to be catalyzed by contaminating metal ions during the "shelf period." The term "ammonium" as used in the tables signifies ammonium carbonate and "sodium" signifies sodium bicarbonate.

Table I
RESIN SHELF LIFE STABILITY AT 25° C.

| Process | R/Si | 1 Day p.p.m. | 1 Wk., p.p.m. | 2 Wks., p.p.m. | 1 Mo., p.p.m. |
|---|---|---|---|---|---|
| Ammonium | 1 | 3 | 3 | 3 | 3 |
| Sodium | 1 | 3 | 40 | 200 | Opaque |
| Ammonium | 1.5 | 1 | 1 | 1 | 1 |
| Sodium | 1.5 | 1 | 45 | 200 | Opaque |
| Ammonium | 1.7 | 1 | 1 | 1 | 1 |
| Sodium | 1.7 | 1 | 50 | 250 | Opaque |

Table II and Table III show measurements based on the heat life stability of the resins evaluated. The data of Table II illustrates a qualitative comparison of the rate of decomposition of cured resin samples of Example 1 and the corresponding resin sample having an R to Si ratio of 1.5 made by the prior art method, by direct measurement of weight losses at 250° from resin treated aluminum strips in accordance with ASTM procedures, over a period of about 6 weeks. A tetramethyl ammonium hydroxide curing catalyst was employed in the resin solutions, and aluminum strips were dipped into the resin solutions and allowed to air dry. The resins were then cured at 150° C. for 1 hour and 24 hours at 200° C. Resin weight losses calculated in terms of percent weight loss based on the initial resin weight were then compiled as shown below:

Table II
PERCENT WEIGHT LOSS MEASUREMENTS AT 250° C.

| Process | R/Si | 2-Day | 4-Day | 7-Day | 14-Day | 21-Day | 42-Day |
|---|---|---|---|---|---|---|---|
| Ammonium | 1.5 | 2.00 | 3.00 | 3.50 | 4.00 | 4.00 | 4.5 |
| Sodium | 1.5 | 3.40 | 4.25 | 4.25 | 5.25 | 5.25 | 6.25 |

Table III shows an evaluation of heat life stability of the resins as determined by changes in breakdown voltages at a temperature of 250° C., over a week's time. Aluminum test strips were prepared in accordance with the above procedure. The thickness of the resin coating on each strip was about 3 mil. The breakdown voltage of the samples were measured directly in kilovolts as illustrated in Table III below. The decomposition in the resin coating made by the sodium bicarbonate process is quite apparent after four days at 250° C., whereas the resin made in accordance with the present invention was still measurable after a fourteen day period.

Table III
BREAKDOWN VOLTAGE AT 250° C.
[In kilovolts (initial film-thickness—3 mil)]

| Process | R/Si | 1-Hr. | 1-Day | 4-Day | 7-Day | 14-Day |
|---|---|---|---|---|---|---|
| Ammonium | 1.5 | 9.8 | 9.7 | 7.9 | 7.1 | 6.5 |
| Sodium | 1.5 | 8.9 | 8.5 | 3.5 | 0 | 0 |

The above data clearly demonstrates the marked superiority of organopolysiloxane resins made according to the ammonium carbonate process as compared to the prior art sodium bicarbonate process with respect to both heat life stability and shelf life stability. As a result of this development, there is now available to the art superior insulating materials in the form of organopolysiloxane resin coatings. In addition organopolysiloxane resin compositions made in accordance with the practice of the present invention can be more suitably adapted to impregnating, laminating, and molding applications, or for use as paint vehicles, or copolymer intermediates.

While the foregoing examples have of necessity been limited to only a few of the very many variables within the scope of the present invention, it should be understood that the present invention covers a broad class of organopolysiloxane resin compositions having an R to Si ratio within the range of 1 to 1.8. In addition the examples have also of necessity been directed to only a few of the many process variables which are practicable in the practice of the process of the present invention. It should be understood moreover, that the process of the present invention is illustrated by both the specific examples given above as well as by the detailed description of the present invention which precede these examples.

What we claim as new and desire to secure by Letters Patent of the United States is:

1. A process comprising the steps of (1) agitating a mixture comprising a halosilane, water, and an ammonium salt of an acid selected from the class consisting of carbonic, formic, acetic, oxalic, malonic, lactic, pyruvic, and ascorbic, and (2) recovering the organopolysiloxane product from (1), where said halosilane is a member selected from the class consisting of organotrihalosilane, a mixture of organotrihalosilane, and diorganodihalosilane, a mixture of organotrihalosilane, diorganodihalosilane, tetrahalosilane and triorganohalosilane, a mixture of organotrihalosilane, diorganodihalosilane and triorganohalosilane, and a mixture of triorganohalosilane, diorganodihalosilane, and tetrahalosilane, and where said halosilane of (1) is utilized in such proportions to provide for an average ratio in said organopolysiloxane product of (2) of from 1 to 1.8 organo radicals per silicon atom attached to silicon by carbon-silicon linkages and selected from the class consisting of monovalent hydrocarbon radicals, halogenated monovalent hydrocarbon radicals and cyanoalkyl radicals.

2. A process in accordance with claim 1, where the said reaction mixture is maintained at a pH of about 5.5 to 7.5.

3. A process in accordance with claim 1, that is conducted at a temperature in the range of about 0° C., to about 60° C.

4. A process in accordance with claim 1, where the ammonium salt is an ammonium salt of carbonic acid.

5. A process in accordance with claim 1, where the said reaction mixture contains a hydrocarbon solvent selected from the class consisting of benzene, xylene, and toluene.

6. A process in accordance with claim 1, where the said halosilane consists of a mixture of organotrihalosilanes and organodihalosilanes having a ratio of up to 4 moles of organodihalosilane per mole of organotrihalosilane.

7. The organopolysiloxane reaction product of claim 1.

References Cited in the file of this patent

UNITED STATES PATENTS

| | | |
|---|---|---|
| 2,449,572 | Welsh | Sept. 21, 1948 |
| 2,568,384 | Cheronis | Sept. 18, 1951 |
| 2,647,881 | Clark | Aug. 4, 1953 |
| 2,830,968 | Clark | Apr. 15, 1958 |
| 2,891,920 | Hyde et al. | June 23, 1959 |

OTHER REFERENCES

Meals et al.: Silicones, Reinhold Publ. Corp., New York, 1959, pages 63–66; 114–115 relied on.